Nov. 10, 1942.    R. L. MALLORY    2,301,301
AIR OPERATED INSTRUMENT
Filed Oct. 7, 1939
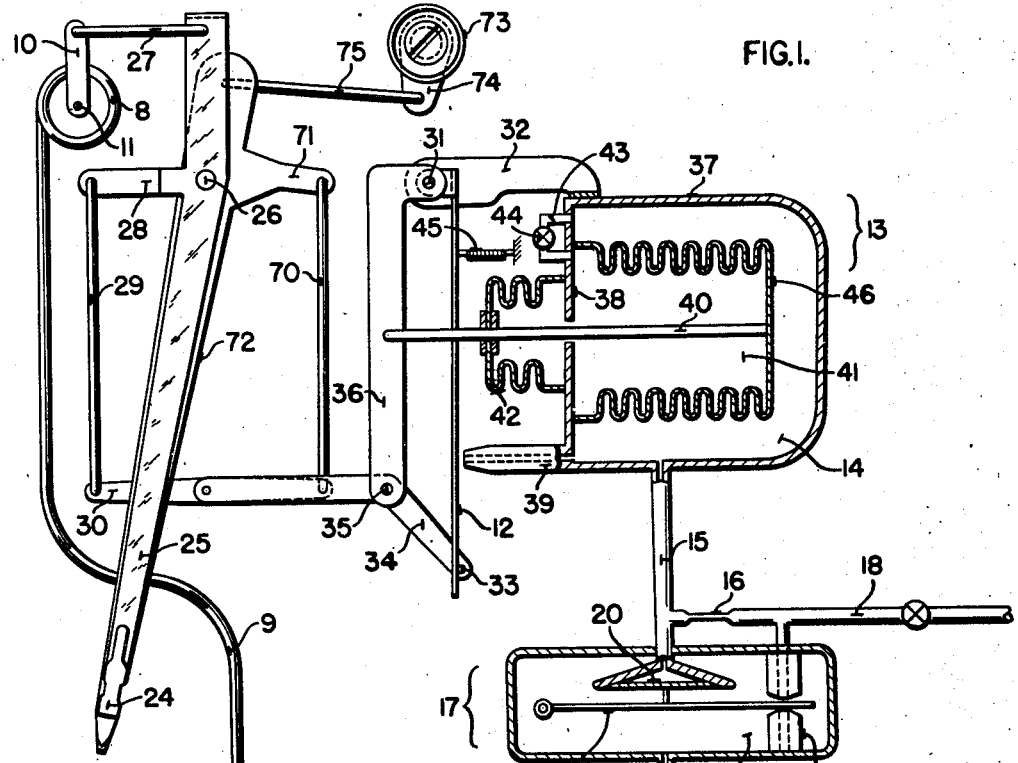
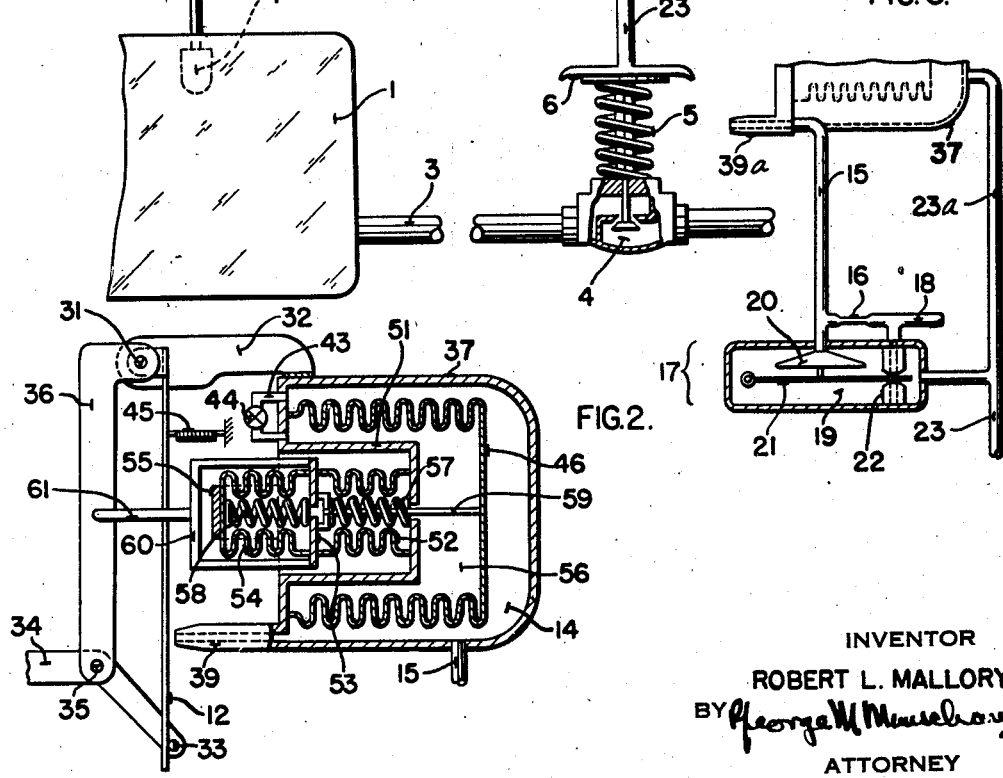
INVENTOR
ROBERT L. MALLORY
BY George W. Muschamp
ATTORNEY Patented Nov. 10, 1942

2,301,301

UNITED STATES PATENT OFFICE 2,301,301

AIR OPERATED INSTRUMENT

Robert L. Mallory, Houston, Tex., assignor to The Brown Instrument Company, Philadelphia, Pa., a corporation of Pennsylvania Application October 7, 1939, Serial No. 298,419

7 Claims. (Cl. 137—139)

My present invention comprises improvements in fluid pressure control apparatus operating to create a control fluid pressure force which is impressed on a fluid pressure control motor or analogous control actuating element and which varies in accordance with changes in a control condition, such for example, as a temperature, a pressure, a height of liquid level, or a velocity, the controlling condition usually, though not necessarily, being returned to, or toward a normal value on a departure therefrom, by the operation of said motor or analogous device.

A main object of the present invention is to provide certain specific improvements in fluid pressure controlling apparatus of the type comprising means whereby a departure in the value of a controlling condition from a predetermined or normal value thereof, varies an air or other elastic fluid pressure control force, and whereby such initial variation in the control force produces a second control force adjustment quickly eliminating more or less of the initial change in the control pressure, and produces a subsequent third control force adjustment by which the effect of the second adjustment is neutralized at a rate suitably retarded to insure the regulation or control stability necessary to avoid hunting. Said second and third adjustments are sometimes referred to as "follow-up" and "compensating" adjustments, respectively, and the third adjustment is also sometimes referred to as an automatic resetting adjustment.

In such control apparatus, the extent to which the initial control pressure adjustment is neutralized by the second adjustment, and the rate at which the third adjustment neutralizes the effect of the second adjustment, should be capable of regulation or calibration to enable the apparatus to give desirable results under varying conditions of operation.

Another main object of the present invention is to provide an air control instrument by which the above mentioned movements are accomplished in a simple manner by the use of an absolute minimum of parts. In my invention a single bellows that is subjected to variations in air pressure on its opposite sides as a result of a change in the value of the condition being measured and controlled is used to operate mechanism that provides the follow-up and compensating movements.

The various features of novelty which characterize the present invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

In the drawing:

Fig. 1 is a diagrammatic view, partly in section, showing one embodiment of my invention;

Fig. 2 is a view, partly in section of a second embodiment; and

Fig. 3 is a view of an embodiment having another arrangement of the control nozzle.

Referring to the drawing there is shown by way of example, a furnace 1 whose temperature is to be controlled. The temperature of the furnace is to be varied by regulating the heating fluid therefor which is supplied through a pipe 3 having a valve 4 in it. The valve is closed by means of the pressure of a spring 5 and is opened varying amounts in response to pressure applied to the upper surface of a diaphragm 6.

Inserted in the furnace is a temperature responsive bulb 7 that is filled with a fluid that expands upon an increase in temperature to cause the expansion of a Bourdon tube 8 to which it is connected by a capillary 9. The Bourdon tube 8 is of helical form and has its stationary end attached to the capillary 9, while its movable end is attached to and adapted to move a lever 10 clockwise around a pivot 11 in response to temperature increases and to move said lever counter-clockwise in response to temperature decreases.

Through suitable connections the operation of the lever 10 gives motion to a flapper valve 12, which as shown, forms part of a control pressure regulator, or air control unit 13, and regulates the escape of air therefrom, and thereby regulates the control air pressure in a regulator chamber 14. The latter receives air through a pipe 15 and a restriction 16. The pressure in the chamber 14 is transmitted through the pipe 15 to the control chamber of a booster valve 17.

Booster valve 17 is supplied with air under regulated pressure from pipe 18 to a controlled pressure chamber 19. Pivoted within the chamber 19 and attached to a diaphragm 20, forming one wall of the control chamber, is a valve 21 that moves between the air entrance of pipe 18 and an exhaust duct 22. Diaphragm 20 is subjected to opposing pressures, namely that in chamber 14 and that in chamber 19 to move the valve 21 between the inlet and exhaust openings to thereby maintain the pressure in chamber 19 proportional to that in chamber 14. A pipe 23 connects the chamber 19 to the control valve 4.

All of the above mentioned parts except the furnace 1, valve 4 and bulb 7, are advantageously combined in a control instrument which may well be a recording meter similar in form to a commercial type meter used for recording temperatures and pressures. Such a meter may include a casing, chart plate, chart, and chart driving motor together with a hinged door, which for sake of clearness, are not shown herein.

The meter recording pen 24 is mounted on the lower end of an arm 25, pivoted at 26, and connected by a link 27 to the lever 10 for movement thereby in accordance with temperature changes in the furnace. An arm 28, extending from the pen arm 25, is connected by a link 29 to one end of a floating lever 30 that is normally pivoted at its right end. The flapper 12 that is pivoted at 31, on a support 32 extending from the control unit 13, is given movements proportional to the temperature changes of the furnace 1 by means of a pin 33 that is projecting from one arm of a bell-crank lever 34 which has its other arm pivotally connected to the center of lever 30. The bell crank 34 is supported for movement at 35 around the lower end of a lever 36 that, along with the flapper is pivoted at 31.

The unit 13 comprises a cup-shaped casing member 37 that is closed by a head 38. Projecting from the head is a nozzle 39 which communicates with the chamber 14 and is variably throttled by the flapper valve 12. Within the casing 37 and attached to the head 38 is an extensible bellows 46 that has a rod 40 attached at one end to its head; the other end of the rod being pivotally connected to the member 36. The head 38 is provided with an opening through which the rod 40 extends, this opening being, in effect, closed to form a second chamber 41 by another and smaller sealing bellows 42. The sealing means for chamber 41 is conveniently shown as the small bellows 42, but may, if desired, take the form of a limp diaphragm or an ordinary stuffing box. The bellows 42 is attached to the rod 40 so that the two bellows 46 and 42 move together as the bellows 46 is expanded or contracted due to pressure changes in the chamber 14. The chambers 14 and 41 are connected by a duct 43 in which is located a variable restriction 44 that may be adjusted to change the rate at which pressures in chambers 14 and 41 may equalize.

In the operation of the device, assuming an increase in the temperature of the furnace above its normal value, the Bourdon tube 8 will be expanded to move lever 10 clockwise and, through link 27, move the pen 24 outwardly along the chart (not shown). This movement will cause the lever 30 to be moved clockwise around its right end to lift the left end of bell-crank 34 and move that lever clockwise so that pin 33 will raise the flapper 12 from the nozzle 39, against the bias of spring 45. This movement of the flapper will permit more air to escape from the chamber 14, lowering the pressure in that chamber and on diaphragm 20. As a result of the decrease in pressure on 20 the valve member 21 will close the inlet to chamber 19 and open the exhaust port 22 and reduce the pressure in that chamber and line 23. A consequent pressure reduction will occur on diaphragm 6 so that the spring 5 will close the valve an amount proportional to the temperature increase in the furnace.

The second or follow-up movement of the instrument that is produced as a result of the initial temperature change results from and is practically contemporaneous with the pressure reduction in chamber 14. Due to the pressure reduction in chamber 14 the bellows 46 expands simultaneously shifting rod 40 to the right. As the rod 40 moves the member 36 is also shifted to the right so that bell-crank 34 and pin 33 will let the flapper return toward its initial position, thus tending to neutralize the original pressure change. The net effect of the initial and follow-up adjustments following any particular departure of the pen from its normal position is a corresponding definite change in the control pressure and a corresponding definite position for the valve 4.

In order to compensate for the temperature increase to bring the value of the furnace temperature back to the control point, the instrument, as a result of its second movement, is given its third or compensating movement. As the bellows 46 expands due to a decrease in pressure in the chamber 14 the volume of chamber 41 will increase and decrease the pressure in that chamber. This pressure change in the chamber 41, however, is so small as to be negligible, so that the pressure in that chamber is still considerably above the reduced pressure in chamber 14. The air in chamber 41 therefor starts to pass through the duct 43, at a rate controlled by the adjustment of restriction 44, into the chamber 14. As this continues pressures in the chambers 41 and 14 are equalized and the bellows 46 returns approximately to its normal length moving the flapper away from the nozzle or toward its original position, again reducing the pressure in chamber 14. Bellows 46 at the termination of the compensating action, will be displaced from its initial position by an amount depending upon the amount of air which is transferred from chamber 41 to chamber 14 during the interval that the bulb 7 was above its normal value. This is in turn dependent upon the original pressure change in chamber 14 and the relative areas of bellows 46 and 42. Thus the amount of unremoved follow-up or the displacement between the position of lever 36 at the end of the follow-up movement and the end of the compensating movement may be varied by varying the area of bellows 42. The less the area of bellows 42 the smaller the unremoved follow-up will be. At this time, assuming that the decreased pressure in chamber 41 has caused sufficient closing of valve 4, that the temperature has returned to its normal value, equilibrium of the apparatus with the bellows 46 and 42 at substantially their normal lengths is obtained with a pressure in chamber 14 different from the pressure in that chamber at the commencement of the operations just described.

Provision is made to change the control point of the instrument, or the normal value of the temperature in the furnace 1 by altering the original position of the flapper 12 relative to the nozzle 39. This is accomplished by adjusting the right end of the lever 30 that is supported by a link 70 from one arm 71 of an index member 72 that is also pivoted at 26. The index member is adapted to extend down in front of the chart to indicate thereon the value at which the instrument is set to maintain. In order to adjust the index 72 there is provided a knob 73 having a crank arm 74 thereon which is connected to the upper end of the index by a link 75. When the knob 73 is rotated the index 72 will be moved across the chart to the desired point and at the same time link 76 will be raised or lowered, as the case may be, to shift the initial position of lever 30 and bellcrank 34 to control flapper 12. Thereafter the Bourdon tube tends to maintain the flapper in its initial position and the temperature of the furnace at the control point.

The embodiment of the invention disclosed in Fig. 2 is essentially the same as that of Fig. 1, but differs therefrom in certain constructional details whose purpose will be set forth below. In the form of the invention of Fig. 1 the natural resiliency of the bellows 46 was used to return those bellows to their normal length during the compensating movement as the pressures in chambers 41 and 14 equalized. At times it is desirable to use some auxiliary force to return the bellows to their normal length. To this end the head 50 that closes the bell shaped casing in Fig. 2 is formed with an inwardly extending cup-shaped portion 51 having an opening through its bottom wall. Fastened to the bottom wall of the part 51 is one end of a bellows member 52 whose other end is attached to a plate 53 that has an opening therethrough. The open end of a bellows 54 is attached to the other face of the plate 53 while the closed end of the bellows is held in a given position by its attachment to a U-shaped member 55 that straddles the bellows and is attached to the face of head 50. Because of the openings in plate 53 and the bottom wall of the portion 51, the interior of bellows 52 and 54 are in communication with the interior of bellows 46 to form a chamber 56 corresponding to the chamber 41 of Fig. 1.

Located within the bellows 52 and tending to force that bellows toward a longer length by means of its engagement with portion 51 and plate 53 is a spring 57. In a like manner a spring 58 is located in the bellows 54 to abut against plate 53 and oppose the spring 57. Because of the springs 57 and 58 the plate 53 is at all times resiliently biased toward a given position.

The connection between the bellows 46 and member 36 whereby movements of that bellows may move the flapper valve 12 comprises a rod 59 that is attached to the bellows and the plate 53. This rod passes through the opening in portion 51 and the spring 57. A yoke member 60 surrounds the bellows 54 and is attached to the plate 53 for movement therewith. The movement of yoke 60 is transferred to member 36 by means of a rod 61.

The operation of this embodiment of the invention is essentially the same as that above described in connection with Fig. 1. Upon movement of the flapper 12 away from nozzle 39 more air can escape therefrom to reduce the pressure in space 14 and cause an expansion of the bellows 46. Such expansion will shift bellcrank 34 to the right by means of the connections including rod 59, plate 53, yoke 60 and rod 61, and at the same time will compress the spring 57. Upon a contraction of the bellows 46 the spring 58 would have been compressed by the plate 53. In either event the force of one of the springs 57 or 58 is added to the natural resiliency of the bellows 46 in returning that bellows to its normal length as the compensating movement takes place. By the use of the springs 57 and 58 the effect of the relative areas of the bellows 46 and 56 is somewhat removed as the tendency for 46 to return to its normal length is more pronounced. In this embodiment, also, the speed of compensation is regulated by the adjustment of the restriction 44, which adjustment should bear a relation to the time lag of the process being controlled. In other words it may be said that, ordinarily the time required for effecting the automatic resetting or compensating adjustment should increase or decrease in accordance with the rate at which change in the controlled process or operation occurs.

In the above described embodiments of the invention the nozzle 39 has been shown in communication with the chamber 14. This is not necessary and another manner in which pressure in chamber 14 may be adjusted is shown in Fig. 3. In that figure the nozzle 39A is supplied directly with air from the line 15 that also communicates with the diaphragm 20. Thus changes in pressure as a result of movement of flapper 12 relative to the nozzle 39A only serve to move the valve member 21 to adjust the pressure in chamber 19. As pressure changes in chamber 19 are applied to the control valve diaphragm through line 23, this same pressure is applied to the chamber 14 through a line 23a connecting with line 23.

The mechanism located in casing 37 in this figure may take the form of either Fig. 1 or Fig. 2. In either case the operation is the same as above described for that embodiment.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In an air control instrument the combination of a cup-shaped casing, a bellows extending into the same to form a chamber therein, a second bellows forming with the first bellows and casing a second chamber, a restricted passageway between said chambers, a supply of air and an exhaust nozzle for said first chamber, a flapper valve for said nozzle, means responsive to the variations in the value of a condition to adjust said valve relative to said nozzle to thereby vary the pressure in said chamber, and means extending through the second bellows and attached to said first bellows operative upon movement of said first bellows in response to a pressure change in the first chamber to readjust the valve in a reverse direction.

2. In an air control instrument, the combination of a cup-shaped casing, a bellows extending into said casing and attached at its open end to the open end of said casing to form between the two an expansible chamber, a second bellows fastened at its open end to the open end of said casing and in opposed relation to said first bellows to form a second expansible chamber therebetween, a rod extending through the end of said second bellows and rigidly connected to the ends of each bellows, a restricted connection between said two chambers, a supply of pressure fluid for said first chamber, an exhaust nozzle for said first chamber, a valve cooperating with said nozzle to regualte the flow of pressure fluid therethrough, and means jointly actuated by variations in the value of a variable condition and by said rod to move said valve relative to said nozzle.

3. In an air control instrument a cup-shaped casing open at one end, a bellows extending into said casing and attached to the same at said end to form between the casing and bellows an expansible chamber varying in size as the pressure in said chamber changes, a second bellows also attached to said casing at said end and forming with the casing and first bellows a second expansible chamber, a rigid connection between said two bellows and extending beyond the second one, a restricted connection between said two chambers whereby a pressure change in one is slowly communicated to the other, a source of fluid under pressure communicating with said first chamber, a bleed nozzle for the first chamber, a valve adapted to regulate the bleed through said nozzle, means to adjust said valve in response to variations in the value of a variable condition to thereby change the pressure in said first chamber and the length of said bellows and means operated by said rigid connection to give a reverse movement to said valve.

4. In an air control instrument, the combination of a casing, a bellows extending into the same to form therewith an expansible chamber, a second bellows cooperating with said casing and first bellows to form a second expansible chamber, a variably restricted connection between said chambers, a source of pressure fluid for said first chamber, an exhaust nozzle for the first chamber, a valve for said nozzle to variably restrict the flow therethrough and thereby vary the pressure in said first chamber and the length of said bellows, means operative upon variations in a variable condition to move said valve relative to said nozzle to change the pressure in the first chamber, and means rigidly connected to both bellows to move said valve in a reverse direction in response to said pressure change.

5. An air control system comprising a closed casing provided with a movable wall therein dividing the same into a plurality of chambers whose size varies in accordance with the position of said wall, a controlled valve mechanism, a connection between said valve and one of said chambers whereby the pressure in the two is the same, a supply of air under regulated pressure for the controlled valve mechanism and said one chamber, an exhaust port in said one chamber, an exhaust valve for said port, means to jointly move said exhaust valve comprising a part moved to a position proportional to the value of a condition and a part connected to said movable wall whereby upon movement of either part the pressure in said one chamber and said controlled valve mechanism will be varied, a restricted connection between said two chambers and means tending at all times to move said movable wall to a given normal position.

6. An air control system comprising a controlled valve mechanism, and a control unit having a closed casing and a movable wall therein forming a pair of chambers, means including a restriction for supplying air simultaneously to said controlled valve mechanism and one of said chambers, a supply of air passing through said restriction, an exhaust valve regulating the exhaust of air from said controlled valve mechanism and said one chamber and therefore the pressure in them, means including means attached to and actuated by said movable wall and means movable in accordance with the value of a condition for positioning said exhaust valve to cause the controlled valve mechanism and said movable wall to assume positions corresponding to the value of the condition, and means including a restriction for equalizing the pressure on opposite sides of the movable wall to cause the controlled valve mechanism to be additionally positioned with respect to the value of the condition.

7. An air control system comprising a controlled valve mechanism and a control unit having a closed casing and a movable wall therein forming a pair of chambers variable in size, means including a restriction through which air is simultaneously supplied to said control valve mechanism and one of said chambers, a supply of air passing through said restriction, an exhaust port for said chamber and controlled valve mechanism, an exhaust valve regulating the flow of air through said port, means operated in response to variations in the value of a variable condition to adjust said valve and thereby change the pressure in said one chamber and controlled valve mechanism, whereby said movable wall will be shifted, a mechanical connection between said movable wall and exhaust valve operative upon movement of said wall to move said exhaust valve, a restricted connection between said two chambers and means at all times tending to move said movable wall to a normal position upon its displacement therefrom.

ROBERT L. MALLORY.